United States Patent [19]

Williamson et al.

[11] 4,379,388
[45] Apr. 12, 1983

[54] OCEAN RAFT ENERGY GENERATOR

[76] Inventors: Byrl L. Williamson; Betty Williamson, both of c/o Good Sam Club P.O. Box 404, Agoura, Calif. 91301

[21] Appl. No.: 248,514

[22] Filed: Mar. 27, 1981

[51] Int. Cl.³ .............................................. F16D 31/02
[52] U.S. Cl. ....................................... 60/398; 60/325; 417/328
[58] Field of Search .................... 60/398, 668, 325; 417/330, 328

[56] References Cited

U.S. PATENT DOCUMENTS

| | | | |
|---|---|---|---|
| 624,483 | 5/1899 | Hamilton et al. | 417/328 |
| 823,431 | 6/1906 | McManus | 417/328 |
| 836,600 | 11/1906 | McManus | 417/328 |
| 4,074,526 | 2/1978 | West | 60/325 |
| 4,105,368 | 8/1978 | Waters | 60/506 |

*Primary Examiner*—A. Michael Chambers
*Attorney, Agent, or Firm*—Melvin R. Stidham

[57] ABSTRACT

A system for generating electricity contained within an ocean raft. The raft has a series of raceways for heavy metal balls, and, as they roll back and forth, they engage levers which reciprocate back-to-back paired pistons in opposite directions. Each pressurizing movement of a piston discharges a jet of fluid to a common pressure tank from which the pressurized fluid drives a turbine.

6 Claims, 6 Drawing Figures

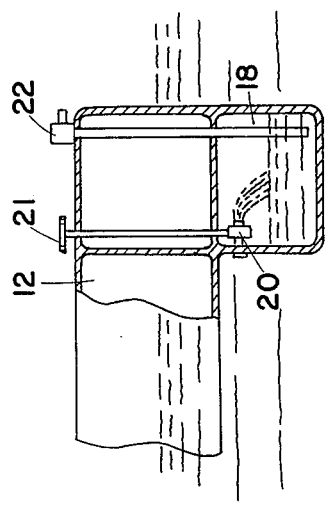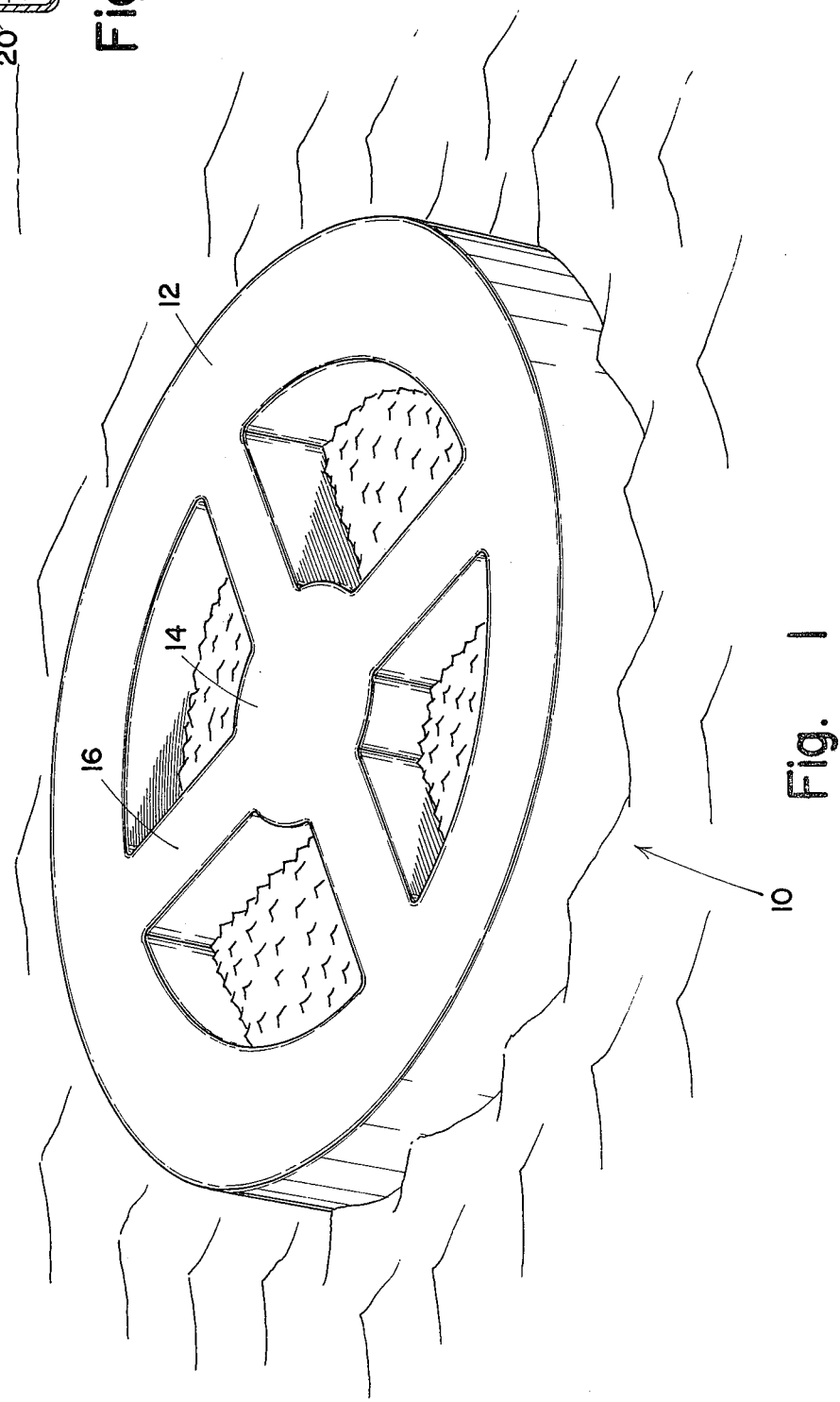

OCEAN RAFT ENERGY GENERATOR

BACKGROUND OF THE INVENTION

Many efforts have been made to convert the energy of ocean waves, currents and tides into a usable form of energy, such as electricity. For example, many have attempted to convert the rise and fall of floats or the like into rotary motion. However, they have met with considerable difficulties in that the movements of such floats are irregular, unpredictable and of varying duration and extent.

OBJECTS OF THE INVENTION

It is an object of this invention to provide a system for generating a rotary drive, which is initiated by ocean waves.

It is a further object of this invention to provide a system for generating electricity from ocean waves.

Other objects and advantages of this invention will become apparent from the description to follow, particularly when read in conjunction with the accompanying drawings.

SUMMARY OF THE INVENTION

In carrying out this invention, I provide an ocean raft in the interior of which are a series of raceways along which heavy metal balls roll back and forth with the ocean waves. The balls engage a plurality of levers, each operating an opposing pair of pistons to force quantities of pressurized liquid into a pressure tank from which the pressurized liquid can drive a turbine or the like to generate electricity. If a ball traverses the full length of the raceway, it engages a spring retracted piston to discharge an additional jet of pressurized fluid toward the pressure tank. Preferably, the raft is annular with spoke-like chambers containing electrical generators, and in each quadrant of the raft there may be several juxtaposed raceways in two or more tiers. Along the raceways may be several pairs of the pistons all discharging pressurized fluid into a common system including a single pressure tank.

BRIEF DESCRIPTION OF THE DRAWINGS

In the drawings:

FIG. 1 is a view in perspective of a circular raft containing energy generating systems of this invention;

FIG. 2 is a partial section view of the raft;

DESCRIPTION OF A PREFERRED EMBODIMENT

Figure 5:
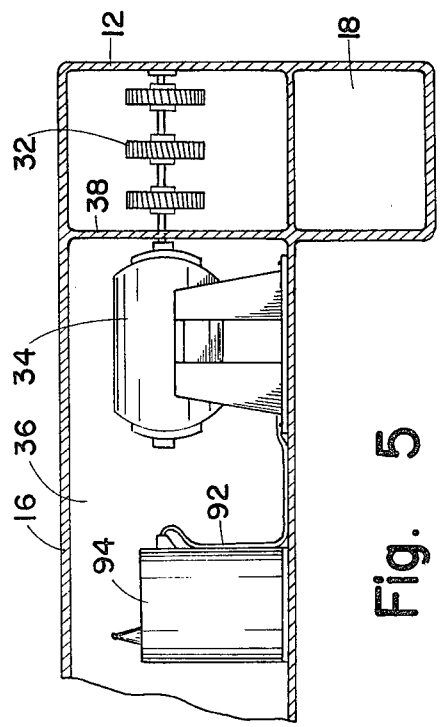
FIG. 5 is a partial vertical section through a spoke portion of the raft.

Referring now to FIGS. 1 and 2 with greater particularity, the energy generating system 10 of this invention may be contained within a raft 12 for flotation on the sea S. The raft 12 is preferably of annular configuration with a central hub 14 and four or more radial spokes 16. For stability, the raft 12 may include a depending ballast chamber 18 in which ballast water is maintained at a desired level by opening a sea cock 20 by valve actuator 21, or operating a bilge pump 22. Both the valve actuator 21 and the bilge pump 22 may be operated remotely, as by means of the electricity generated aboard, with a battery standby.

Figure 3:
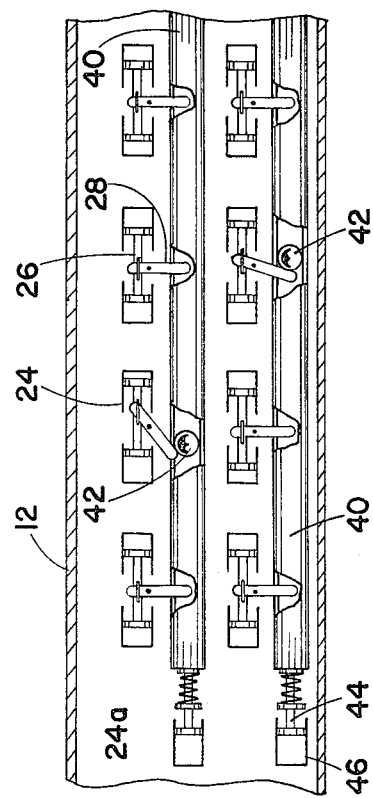
FIG. 3 is a partial vertical section showing the raceways and balls.
Figure 4:
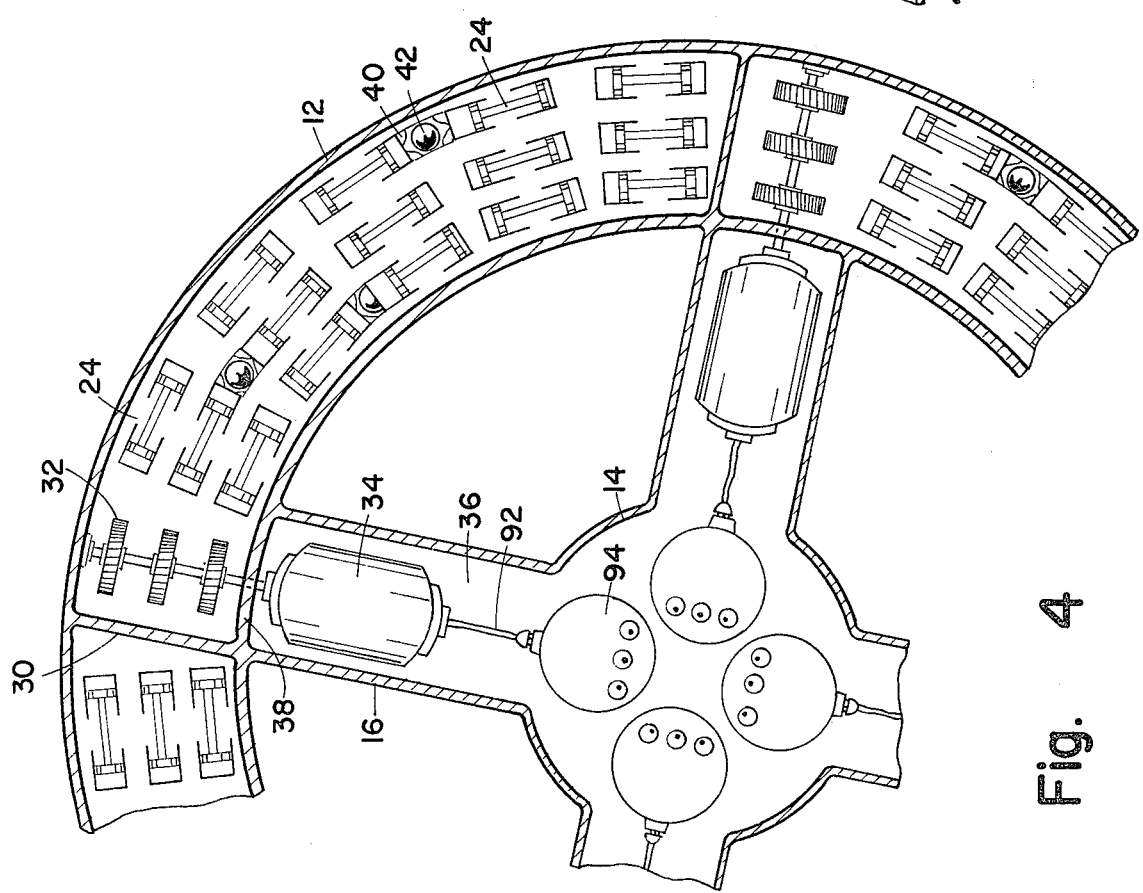
FIG. 4 is a partial horizontal section of the circular raft.

Referring now to FIGS. 3, 4 and 5, the motion of the raft as it rides on the sea S is used to generate pressure in a fluid system to be described by reciprocation of a series of back to back piston pumps 24, which are tied together by a single piston rod 26 to which a lever arm 28 is pivoted. As will be later described, as each piston is forced to its compression position adjacent the head 24a of the piston, a jet of hydraulic fluid under pressure is introduced into the pressure system.

As indicated in FIGS. 3 and 4, the circular raft 12 is divided into quadrants by walls 30 between which are contained arcuate rows of paired piston 24 disposed end to end. There may be a series of such arcuate rows disposed coaxially, as well as two or more tiers thereof (FIG. 3). A hyraulically driven wheel, such as a turbine 32, is disposed in each quadrant for rotation by the hydraulic system contained therein, and a generator 34 is driven by the turbine 32 in a compartment 36 isolated thereform by means of an arcuate wall 38.

Below each arcuate row of end to end paired pistons 24 is a raceway 40 in which a heavy ball 42 of steel or the like, e.g. in excess of one hundred pounds, is free to roll back and forth with a rolling motion of the raft 12. Hence, as the heavy ball 42 rolls toward the left in FIG. 3 it will engage each lever 28 successively, to pivot it toward the left and force the associated paired pistons to the right. If the ball traverses the full length of the raceway 40 before reversing, it will engage a spring retracted piston rod 44 contained within a cylinder 46 to send an additional charge of pressurized fluid. On the other hand, if it does not traverse the full length of the raceway 40 it will simply roll back toward the right and pivot each lever 28 it engages in the opposite direction to discharge fluid from the other cylinder.

Figure 6:
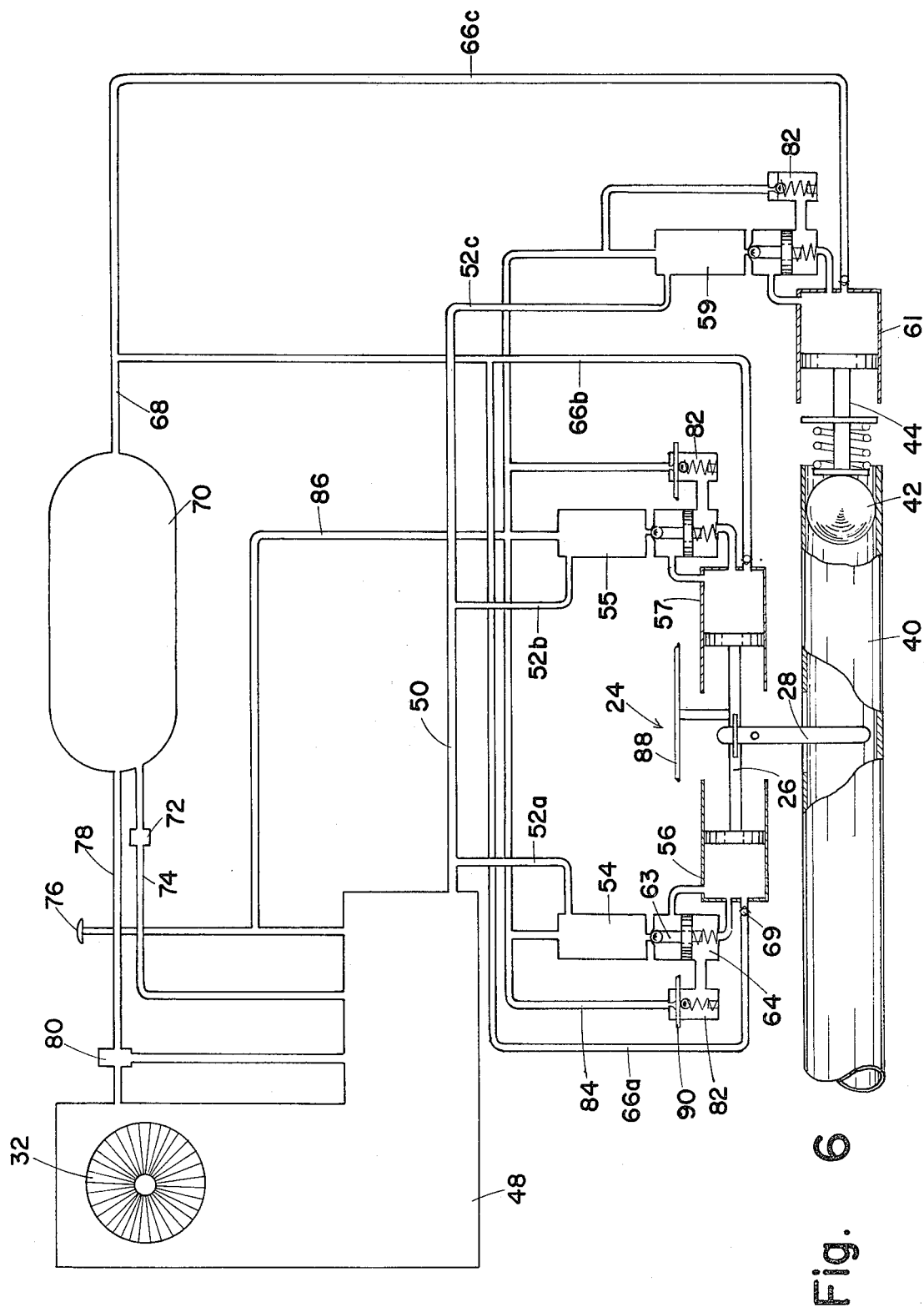
FIG. 6 is a schematic diagram of the hydraulic system forming part of this invention.

Now referring more particularly to FIG. 6, the hydraulic systems of this invention includes a supply tank 48 from which fluid is driven through lines 50 and 52a, 52b to accumulators 54 and 55 to the two cylinders 56, 57 making up each pair 24 thereof. A third line 52c delivers fluid to the accumulator 59 for the cylinder 61 of the spring actuated piston 44 at the end of each raceway 40.

The accumulators 54, 55 and 59 ensure an adequate supply of hydraulic fluid for each cylinder 56, 57 and 61 and a float operated check valve 63 in the port of each accumulator allows flow of fluid into the appropriate cylinder until there is enough fluid in the chamber 64 to float the check valve 63 against its seal.

Pressure ducts 66a, 66b and 66c, which open from each piston 56, 57 and 61 through one-way check valves 69, are connected to main pressure line 68, which opens into a pressure tank 70. A safety valve 72 in a bleed line 74 will relieve the tank 70 in the event of excessive pressure by dumping a quantity of fluid to the supply tank 48, which is vented at 76. The pressurized fluid in tank 70 is discharged at 78 to drive the turbine 32 which, in turn, discharges into the supply tank 48. An over speed governor 80 may be provided to dump fluid from the pressure line 78 in the event that the turbine rotates too fast.

If desired, vacuum breakers 82 may be provided to relieve each cylinder 56, 57 and 59 at the end of its power stroke. Each vacuum breaker 82 comprises a one-way check valve in a line 84, 86 which is opened to vent at 76 and a push rod 88 which is carried on the tie rod 26 of each piston pair 24 engages a rod 90 on each vacuum breaker 82 to unseat the ball check and vent the cylinder 56 or 57.

It is contemplated that the cylinders 56 and 57 of all paired pistons 24 in a quadrant of the raft 12 will be connected to a single pressure tank 70 to drive a single turbine 32. Each turbine will drive a generator 34 to deliver electricity at 92 to a bank of transformers 94 and thence by suitable power lines (not shown) to an onshore station.

In a large raft, the hub 14 could be fitted with living quarters for operating personnel, and could even contain intercontinental missiles.

While this invention has been described in conjunction with a preferred embodiment thereof it is obvious that modifications and changes therein may be made by those skilled in the art without departing from the spirit and scope of this invention as defined by the claims appended hereto.

What is claimed as invention is:

1. A system for generating energy comprising:
a hollow flotation raft;
at least one raceway of arcuate cross-section in said raft;
a heavy metal ball in each said raceway to roll therealong in either direction in response to movement of said raft on the sea;
a hydraulic system; and
a prime mover driven by pressurized liquid in said hydraulic system;
said hydraulic system comprising:
at least one pair of aligned cylinders along each raceway disposed with their heads at opposite ends;
a pair of pistons slidable in said cylinder;
a push rod interconnecting said pistons;
a pivoted lever connected to said push rod and extending into the path of travel with a ball on said raceway so that engagement of said lever by said ball rolling in opposite directions will reciprocate said interconnected pistons;
a pressure tank;
supply conduits connected between the closed ends of said cylinders and said pressure tanks;
a delivery conduit opening from said pressure tank for delivery of pressurized fluid to said prime mover;
a reservoir for hydraulic fluid positioned above said cylinders;
an accumulator chamber connected between said reservoir and each of said cylinders to ensure a ready supply of fluid thereto; and
a float-operated, one-way check valve below said chamber and above said cylinder to open for flow to said cylinder in the event of any fluid insufficiency therein;
a vent line connecting the head of each said cylinder to atmosphere;
a valve member normally closing off said vent line; and
means on said push rod for opening said valve member at the end of a pressure stroke of each piston.

2. The system defined by claim 1 including:
a cylinder at the end of each said raceway with an open end thereof facing said raceway;
a piston reciprocable in each said cylinder;
auxiliary feed conduit connected from said reservoir to each of said augmenting cylinders;
one-way check valves on each of said auxiliary feed conduits enabling flow of fluid towards said augmenting cylinder only;
auxiliary supply conduits connected between the closed ends of said cylinders and said pressure tank; and
spring means for retracting said augmenting pistons.

3. The system defined by claim 1 where:
said raft is of circular configuration and including:
means dividing said raft into arcuate chambers;
there being a hydraulic system in each of said arcuate chambers.

4. The system defined by claim 3 including:
a central hub;
a radial chamber connected to each of said arcuate chambers; and
electrical generating means in at least one of said radial chambers;
said prime mover being connected to drive said electrical generating means.

5. The system defined by claim 1 including:
a plurality of juxtaposed raceways in said raft;
a heavy metal ball in each of said raceways; and
a hydraulic system associated with each of said raceways with supply conduits connected to a common pressure tank.

6. The system defined by claim 1 wherein:
there is more than one tier of said raceways, each with a hydraulic system, all of which are connected to a common pressure tank.

* * * * *